(12) United States Patent
Jo et al.

(10) Patent No.: US 11,945,912 B2
(45) Date of Patent: Apr. 2, 2024

(54) POLYIMIDE FILM COMPRISING OMNIDIRECTIONAL POLYMER CHAIN, METHOD FOR MANUFACTURING SAME, AND GRAPHITE SHEET MANUFACTURED USING SAME

(71) Applicant: PI ADVANCED MATERIALS CO., LTD., Chungcheongbuk-do (KR)

(72) Inventors: Hyong Sop Jo, Chungcheongbuk-do (KR); Jae Hyun Kim, Chungcheongbuk-do (KR)

(73) Assignee: PI ADVANCED MATERIALS CO., LTD., Chungcheongbuk-do (KR)

( * ) Notice: Subject to any disclaimer, the term of this patent is extended or adjusted under 35 U.S.C. 154(b) by 838 days.

(21) Appl. No.: 16/979,233

(22) PCT Filed: Nov. 20, 2018

(86) PCT No.: PCT/KR2018/014289
§ 371 (c)(1),
(2) Date: Sep. 9, 2020

(87) PCT Pub. No.: WO2019/182224
PCT Pub. Date: Sep. 26, 2019

(65) Prior Publication Data
US 2020/0399427 A1    Dec. 24, 2020

(30) Foreign Application Priority Data
Mar. 22, 2018   (KR) .................. 10-2018-0033348

(51) Int. Cl.
*C08G 73/10*   (2006.01)
*C01B 32/205*  (2017.01)
*C08J 5/18*    (2006.01)

(52) U.S. Cl.
CPC ........ *C08G 73/1071* (2013.01); *C01B 32/205* (2017.08); *C08G 73/1021* (2013.01);
(Continued)

(58) Field of Classification Search
CPC ............ C08G 73/1071; C08G 73/1021; C08G 73/1032; C08G 73/0661; C08G 73/1007;
(Continued)

(56) References Cited

U.S. PATENT DOCUMENTS

2010/0196716 A1* 8/2010 Ohta ...................... B32B 9/045
                                                                    428/408

FOREIGN PATENT DOCUMENTS

CN    104176733 A    12/2014
JP    2002-293932 A  10/2002
(Continued)

OTHER PUBLICATIONS

Definition of "estimate," accessed online at https://www.merriam-webster.com/dictionary/estimated on Jul. 28, 2023 (Year: 2023).*
(Continued)

*Primary Examiner* — Daniel C. McCracken
(74) *Attorney, Agent, or Firm* — Harness, Dickey & Pierce, P.L.C.

(57) ABSTRACT

The present invention provides a method of manufacturing a polyimide film including unit polymers that are omnidirectionally distributed, and a polyimide film. The present invention also provides a graphite sheet having good quality manufactured using the polyimide film.

13 Claims, 4 Drawing Sheets

(52) U.S. Cl.
CPC ............ *C08G 73/1032* (2013.01); *C08J 5/18* (2013.01); *C08J 2379/08* (2013.01)

(58) Field of Classification Search
CPC ....... C01B 32/205; C08J 5/18; C08J 2379/08; C01P 2006/32; C04B 35/52; C04B 41/83; C04B 35/522; C08K 5/09; C08L 79/08
See application file for complete search history.

(56) References Cited

FOREIGN PATENT DOCUMENTS

| JP | 2007-177024 A | 7/2007 |
|---|---|---|
| JP | 5020068 B2 | 9/2012 |
| JP | 2014-148125 A | 8/2014 |
| JP | 2017-160120 A | 9/2017 |
| JP | 2017-179153 A | 10/2017 |

OTHER PUBLICATIONS

Definition of "empirically," accessed online at https://www.merriam-webster.com/dictionary/empirically on Jul. 28, 2023 (Year: 2023).*

Hatori, et al., In-Plane Orientation and Graphitizability of Polyimide Films: II. Film Thickness Dependence, Carbon 1993; 31(8): 1307-1312 (Year: 1993).*

Berkebile, et al. The Use of "Kapton" Polyimide Film in Aerospace Applications, SAE Transactions 1981; 90(4): 811015-811426, pp. 3562-3568 (Year: 1981).*

Office Action from corresponding Chinese Patent Application No. 201880091560.9, dated Jul. 20, 2022.

International Search Report from corresponding PCT Application No. PCT/KR2018/014289, dated Apr. 26, 2019.

* cited by examiner

POLYIMIDE FILM COMPRISING OMNIDIRECTIONAL POLYMER CHAIN, METHOD FOR MANUFACTURING SAME, AND GRAPHITE SHEET MANUFACTURED USING SAME

CROSS-REFERENCE TO RELATED APPLICATIONS

This application is a national phase application of PCT Application No. PCT/KR2018/014289, filed on Nov. 20, 2018, which claims the benefit of Korean Patent Application No. 10-2018-0033348, filed on Mar. 22, 2018. The entire disclosures of the applications identified in this paragraph are incorporated herein by references.

FIELD

The present invention relates to a polyimide film including an omnidirectional polymer chain, a method of manufacturing the same and a graphite sheet manufactured using the same.

BACKGROUND

Recently, electronic devices have gradually become lighter, smaller, thinner, and more highly integrated in the structure thereof, and many problems related to heat load are occurring with the increase in the amount of heat generated per unit volume. Such problems typically directly affect the performance of electronic devices, such as reducing the operation speed of semiconductors due to the heat load of the electronic device and shortening the lifetime of the battery due to deterioration thereof.

For this reason, effective heat dissipation from electronic devices has emerged as a very important task.

Graphite having high thermal conductivity is receiving attention as heat dissipation means for use in electronic devices. In particular, an artificial graphite sheet that is easy to process in a sheet form and has thermal conductivity about 2 to 7 times superior to that of copper or aluminum is in the spotlight.

Such an artificial graphite sheet may be manufactured through carbonization and graphitization of a polymer. Among the polymers, a heat-resistant polymer capable of withstanding a temperature of about 400° C. or higher may be used as a graphite precursor. A representative example of such a heat-resistant polymer is polyimide (PI).

Polyimide is a polymer material having the highest level of heat resistance, drug resistance, electrical insulation, chemical resistance, and weather resistance among organic materials, based on a rigid aromatic backbone and an imide ring having vastly superior chemical stability. It is known as an optimal graphite precursor because it enables high yield, crystallinity and thermal conductivity in the manufacture of artificial graphite sheets.

A representative example of a method of manufacturing an artificial graphite sheet using polyimide is a method of heat-treating polyimide to an ultrahigh temperature of about 2000° C. or more.

The above method is based on the main principle whereby the precursor polyimide is converted into graphite, which is a carbon crystal, by sublimating and removing components other than carbon, for example, non-carbon substances such as oxygen, nitrogen, additives, other substances and the like, from polyimide through heat treatment at an ultrahigh temperature and inducing rearrangement of remaining carbon using thermal energy.

However, in the process of heat treatment at an ultrahigh temperature, unexhausted sublimation gas remaining in the polyimide film may interfere with carbon rearrangement. In this case, it may be difficult to convert into high-purity artificial graphite. Moreover, the unexhausted sublimation gas may greatly reduce the crystallinity of artificial graphite.

Therefore, in order to realize an artificial graphite sheet having good quality, efficient exhaust of the sublimation gas is important. For reference, it is to be understood that it is related to the yield of the finished product having good quality.

In connection therewith, assuming that graphitization proceeds almost simultaneously on the surface layer of the polyimide film and inside, when a relatively high pressure is created in the sublimation gas generated from the inside and the gas is exhausted through the surface layer, the graphite crystal structure that is forming or formed on the surface layer may be destroyed. Accordingly, surface defects such as cracks, pinholes and protrusions may be formed on the outer surface of the ultimately obtained artificial graphite sheet.

Hence, there is a need for a novel polyimide film distinguished from conventional polyimide films known to date in that it is capable of realizing an artificial graphite sheet having higher quality, and a novel method of manufacturing the same.

SUMMARY

Technical Problem

An objective of the present invention is to provide a polyimide film including an omnidirectional polymer chain, a method of manufacturing the same, and a graphite sheet manufactured using the same.

According to an aspect of the present invention, an imidization accelerator, a dehydration agent, and a heat-treatment temperature are disclosed as factors essential to the formation of a polyimide film for manufacturing a graphite sheet.

In particular, when specific processing conditions to be described later related to the above factors are satisfied, the polyimide film may include second unit polymers that are omnidirectionally distributed. Thus, for example, multiple and complex gas exhaust pathways may be formed between the omnidirectionally distributed second unit polymers, and thus, even when the polyimide film is processed using carbonization and graphitization, gas may be efficiently exhausted, ultimately making it possible to obtain an artificial graphite sheet having good quality.

Therefore, the present invention has a practical purpose of realizing specific embodiments thereof.

Technical Solution

In the present invention, when imidizing polyamic acid, it was noted that the use of imidization accelerator and dehydration agent strongly affect the expression of the omnidirectional unit polymers described above. Accordingly, it will be explained that an ideal mode for the expression of omnidirectional unit polymers may be realized under the following processing condition (a) related to the imidization accelerator.

$$540 \ \mu m < C^2 * T < 610 \ \mu m \tag{a}$$

Here, C is the sum of the molar amount of the imidization accelerator that is added and the molar amount of the dehydration agent that is added relative to 1 mol of the amic acid group of polyamic acid, and T is the thickness of the polyimide film.

An embodiment of the present invention provides a method of manufacturing a polyimide film capable of exhibiting omnidirectionality of unit polymers by satisfying the processing condition (a).

Another embodiment of the present invention provides a polyimide film having therein omnidirectionality of unit polymers by satisfying the processing condition (a).

Still another embodiment of the present invention provides a graphite sheet having a very good appearance using the omnidirectional polyimide film.

Hereinafter, embodiments of the invention will be described in more detail in the order of the "method of manufacturing polyimide film", "polyimide film" and "graphite sheet" according to the present invention.

Before the description, the terms or words used in the description and the claims of the present invention are not to be construed limitedly as having typical or dictionary meanings, and should be interpreted as having meanings and concepts of the invention in keeping with the scope of the invention based on the principle that the inventors can appropriately define the terms in order to describe the invention in the best way.

Therefore, the configuration of the embodiment described in the present specification is merely the most preferred embodiment of the present invention and does not represent the technical idea of the present invention, and it should be understood that at the time of the present application, there may be various equivalents and modifications capable of replacing the same.

In the present specification, the singular forms are intended to include the plural forms as well, unless the context clearly indicates otherwise. In the present specification, the terms "comprise", "include", "have", etc., when used in this specification specify the presence of stated features, integers, steps, elements, or combinations thereof, but do not preclude the presence or addition of one or more other features, integers, steps, elements, or combinations thereof.

In the present specification, "dianhydride" is intended to include precursors or derivatives thereof, which may not technically be dianhydride, but will nevertheless react with diamine to form polyamic acid, which may then be converted into polyimide.

In the present specification, "diamine" is intended to include precursors or derivatives thereof, which may not technically be diamine, but will nevertheless react with dianhydride to form polyamic acid, which may then be converted into polyimide.

In the present specification, when an amount, concentration, or other value or parameter is given as an enumeration of a range, a preferred range or a preferred upper limit and a preferred lower limit, it is to be understood as specifically disclosing all ranges formed from any pair of any upper range limit or preferred value and any lower range limit or preferred value, whether or not such ranges are disclosed explicitly. When the range of numerical values is referred to herein, unless stated otherwise, the range is intended to include its endpoints and all integers and fractions within that range. The scope of the present invention is not intended to be limited to the specific values mentioned when defining the range.

In the present specification, "omnidirectional" is intended to be the opposite of "nematic". For example, when molecules are distributed in a closed system, even if the positions of the molecules are different and arranged irregularly, the state in which they all face a certain direction may be called "nematic". Conversely, "omnidirectional" may be understood as not only different positions of molecules, but also different or irregular directions thereof when molecules are distributed in a closed system.

In the present specification, "unit polymer" means an independent polymer chain or a polymer resin portion constituting a polymer resin resulting from crosslinking, and even unit polymers of the same category may have different chemical structures, and conversely, unit polymers of the same category may all have the same chemical structure.

First Aspect: Method of Manufacturing Polyimide Film

According to the present invention, the method of manufacturing the polyimide film includes:

preparing a polyamic acid solution including first unit polymers by mixing a first organic solvent, a diamine monomer and a dianhydride monomer;

preparing a precursor composition by mixing the polyamic acid solution, at least one imidization accelerator, and at least one dehydration agent; and forming a polyimide film including second unit polymers into which the first unit polymers are converted by imidizing the precursor composition at a variable temperature.

The manufacturing method may also satisfy the following processing condition (a).

$$540 \ \mu m < C^2 * T < 610 \ \mu m \quad (a)$$

Here, C is the sum of the molar amount of the imidization accelerator that is added and the molar amount of the dehydration agent that is added relative to 1 mol of the amic acid group of polyamic acid, and T is the thickness of the polyimide film.

The thickness of the polyimide film may be the thickness of a final single-layer polyimide film.

It will be obvious to those skilled in the art that, even if the thickness of the finally obtained polyimide film is not measured, it is possible to use the thickness estimated empirically based on the weight of the precursor composition capable of forming a single-layer polyimide film. Accordingly, it is to be understood that the thickness estimated empirically based on the weight of the precursor composition may be used for the thickness "T" of the polyimide film in the processing condition (a) of the present invention.

The precursor composition may be fluid, and the polymer chains of the polyamic acid, particularly the first unit polymers, may be fluid.

Here, the first unit polymers may be regarded as having an omnidirectional state because the positions thereof are different from each other and there is no regularity in positions, and the directions thereof are also different.

On the other hand, in the state in which the flow of unit polymers is practically impossible, for example, in the case of a solid-state polymer, most of the unit polymers may typically overlap or be oriented so as to face a certain direction. This is the opposite of the omnidirectional state, and is defined as a nematic state, and a typical polyimide film shows unit-polymer distribution in a nematic state.

However, surprisingly, when the processing condition (a) is satisfied in the manufacture of the polyimide film, the "omnidirectional state" may be present in the polyimide film that is ultimately manufactured, which is the advantage of the manufacturing method according to the present invention.

When the processing condition (a) is satisfied, the imidization of the first unit polymers, which are omnidirectionally distributed, is promoted to a desirable extent, and the first unit polymers are imidized while maintaining the omnidirectional state thereof, whereby the second unit polymers may be formed in the omnidirectional state.

Meanwhile, the higher the proportion of the omnidirectional polymer in the polyimide film, the stronger the interaction with the adhesive. Therefore, when the manufactured polyimide film is tested using an adhesive, it is expected that the higher the adhesion that is measured, the more the omnidirectional second unit polymers are contained. That is, the adhesion of the corona-treated polyimide film may be regarded as an indicator of the omnidirectionality of polymers.

In a specific embodiment, when the polyimide film manufactured through the method according to the present invention is tested using an adhesive after corona treatment, adhesion of the polyimide film may be 1400 gf/mm or more.

Figure 1:
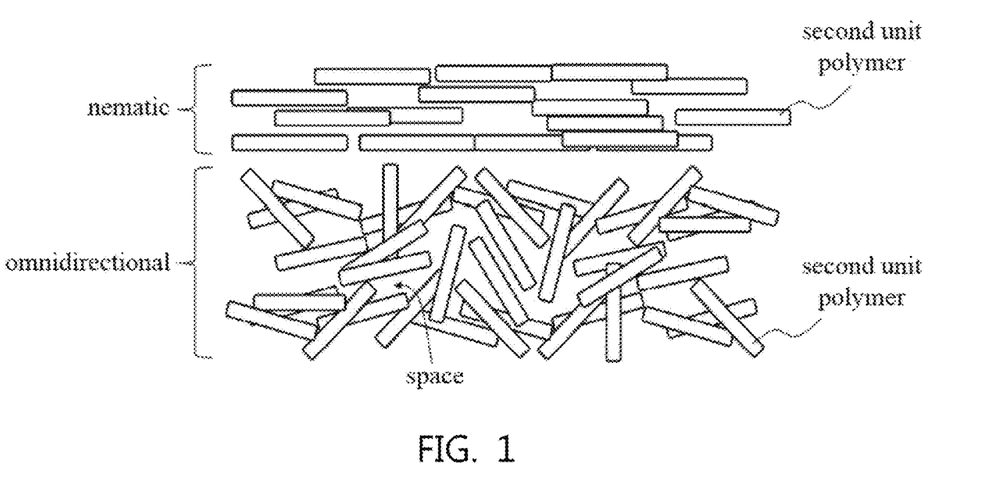
FIG. 1 schematically shows the distribution of second unit polymers constituting a polyimide film.

The adhesion of the polyimide film is a factor largely related to the omnidirectionality of unit polymers, and is described in more detail with reference to the drawing.

With regard thereto, FIG. 1 schematically shows the distribution pattern of unit polymers in the polyimide film. For reference, in FIG. 1, the omnidirectional state and the nematic state are shown together to emphasize the difference therebetween, and they are also shown in the state of being positionally separated. This is only for understanding, and in reality, the omnidirectional state and the nematic state may not be located separately from each other.

Some of the second unit polymers are distributed in an omnidirectional state, and others thereof may be distributed close to a nematic state or in a nematic state. However, when the processing condition (a) is satisfied, the omnidirectional state may proportionally exceed the nematic state.

The second unit polymers distributed in an omnidirectional state form a number of spaces therebetween and are entangled in a complex manner, and thus the surface thereof is irregular, resulting in a relatively large surface area.

The second unit polymers distributed in a nematic state are arranged side by side in a certain direction, for example, in a horizontal direction, so the space formed between the unit polymers is relatively small, whereby the surface thereof is uniformly formed, resulting in a relatively small surface area.

In the case of the omnidirectional state, strong adhesion may be exhibited after corona treatment due to the large surface area, whereas the nematic state may exhibit relatively weak adhesion after corona treatment due to the small surface area.

Therefore, the presence or absence of the second unit polymers, distributed in an omnidirectional state, can be confirmed based on the difference in adhesion. For this reason, the adhesion of the corona-treated polyimide film is also regarded as an important factor for confirming the embodiment of the present invention.

If interpreted differently from FIG. 1, the second unit polymers that are omnidirectionally distributed are complexly entangled or coagulated while a number of spaces are formed therebetween. These spaces may provide exhaust pathways for gases, for example, sublimation gases that are inevitably generated during carbonization or graphitization.

Therefore, when manufacturing a graphite sheet using the polyimide film, gas flows efficiently from the inside of the film to the outside, making it possible to obtain a graphite sheet having good quality. Specifically, assuming that graphitization proceeds almost simultaneously on the surface layer of the polyimide film and inside, relatively low pressure is created in the gas generated from the inside, and thus the possibility of the carbonization structure that is forming or formed on the surface layer being destroyed by the gas exhausted through the surface layer is low, whereby the graphite sheet may be formed to have a smooth surface.

The method according to the present invention may further satisfy the following processing condition (b), in addition to the processing condition (a).

$$1.0 \ \mu m/°C. \leq (C^2 * T)/K \leq 1.25 \ \mu m/°C. \qquad (b)$$

Here, C is the sum of the molar amount of the imidization accelerator that is added and the molar amount of the dehydration agent that is added relative to 1 mol of the amic acid group of polyamic acid, T is the thickness of the polyimide film, and K is the average value of the highest temperature and the two temperatures closest thereto among the temperatures formed in the second heat treatment.

The imidization may include first imidization through heat treatment at a relatively low temperature and second imidization through heat treatment at a relatively high temperature.

The second imidization may include first heat treatment at a variable temperature in the range from 200° C. to 450° C. and second heat treatment at a variable temperature in the range of 550° C. or less but exceeding 450° C.

In general, as the temperature increases during imidization, the first unit polymers tend to be converted from an omnidirectional state into a nematic state.

The processing condition (b) is to establish the relationship between the imidization accelerator, the thickness, and the optimal imidization temperature "K", which allows omnidirectionality to be present in the polyimide film, while preventing the degradation of the properties of the polyimide film.

When the processing condition (a) is satisfied, the imidization is preferably promoted as described above, but it may be difficult to cast polyimide in a uniform film form. Nevertheless, when not only the processing condition (a) but also the processing condition (b) are satisfied, the omnidirectionality of the second unit polymers may be realized to a desired level, it may be easy to manufacture a polyimide film, and it may be possible to form a polyimide film having properties suitable for manufacturing a graphite sheet.

In the present invention, at least one of the first heat treatment and the second heat treatment may be performed using an infrared-ray heater.

Meanwhile, the imidization accelerator, dehydration agent, polyamic acid, and specific method of imidization according to the present invention will be described in detail through the following non-limiting examples.

<Imidization Accelerator>

In a specific embodiment, the imidization accelerator is a component having an effect of promoting the ring-closing dehydration reaction of the amic acid group of the first unit polymers, and may be at least one selected from the group consisting of quinoline, isoquinoline, β-picoline and pyridine, and particularly may be β-picoline alone, or a mixture of β-picoline and at least one excluding the same.

The molar amount of the imidization accelerator that is added may be 0.43 to 0.6 relative to 1 mol of the amic acid group of polyamic acid.

If the molar amount of the imidization accelerator that is added is less than the above lower limit, the omnidirectional second unit polymers may not be formed to a desired level.

On the other hand, if the molar amount thereof exceeds the above upper limit, the molar amount of the dehydration agent that is added has to be reduced in order to satisfy the above processing conditions (a) and (b), but even in this case, the promotion of the ring-closing reaction of the imidization accelerator and the dehydration reaction of the dehydration agent are not balanced, and thus the omnidirectional second unit polymers may not be formed to the desired level.

Moreover, in the case in which the amount of the imidization accelerator that is added is unconditionally increased, imidization may be promoted in excess before casting the precursor composition in a thin film, which may cause appearance defects such as pinholes in the manufactured polyimide film.

The dehydration agent is a component that enables dehydration and ring closure of the amic acid group of the first unit polymers, and may be at least one selected from the group consisting of acetic anhydride, propionic anhydride, and lactic anhydride, and particularly may be acetic anhydride alone, or a mixture of acetic anhydride and at least one excluding the same.

The molar amount of the dehydration agent that is added may be 2.50 to 3 relative to 1 mol of the amic acid group of polyamic acid.

If the molar amount of the dehydration agent that is added is less than the above lower limit, the omnidirectional second unit polymers may not be formed to the desired level.

On the other hand, if the molar amount thereof exceeds the above upper limit, the molar amount of the imidization accelerator that is added has to be reduced in order to satisfy the above processing conditions (a) and (b), but even in this case, the promotion of the ring-closing reaction of the imidization accelerator and the dehydration reaction of the dehydration agent are not balanced, and the omnidirectional second unit polymers may not be formed to the desired level, and defects may occur in the manufactured polyimide film.

In the step of preparing the precursor composition in the manufacturing method according to the present invention, a second organic solvent may be added along with the imidization accelerator and the dehydration agent. However, in the case in which the second organic solvent is used, it may be used to the extent that the imidization accelerator and the dehydration agent may be dissolved, and particularly, the molar amount of the second organic solvent that is added may be 2.9 to 3.3 relative to 1 mol of the amic acid group, and may be appropriately set depending on the thickness of the polyimide film that is manufactured.

The second organic solvent is not particularly limited, and any solvent may be used, so long as it dissolves the imidization accelerator and the polyamic acid, but it is preferably an amide-based solvent. Specifically, the solvent may be an organic polar solvent, particularly an aprotic polar solvent, and may include, without being limited to, at least one selected from the group consisting of N,N'-dimethylformamide (DMF), N,N'-dimethylacetamide, N-methyl-pyrrolidone (NMP), gamma-butyrolactone (GBL), and diglyme, which may be used alone or in combinations of two or more thereof, as necessary. In an exemplary embodiment, N,N-dimethylformamide and N,N-dimethylacetamide are particularly preferably used as the solvent.

<Preparation of Polyamic Acid>

In a specific embodiment, polyamic acid may be prepared through polymerization of at least one diamine monomer and at least one dianhydride monomer ('acid dianhydride') in the first organic solvent.

The dianhydride monomer that may be used to prepare polyamic acid may include pyromellitic dianhydride, 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, 3,3',4,4'-benzophenonetetracarboxylic dianhydride, 2,2-bis(3,4-dicarboxyphenyl) propane dianhydride, 3,4,9,10-perylene tetracarboxylic dianhydride, bis(3,4-dicarboxyphenyl) propane dianhydride, 1,1-bis(2,3-dicarboxyphenyl) ethane dianhydride, 1,1-bis(3,4-dicarboxyphenyl) ethane dianhydride, bis(2,3-dicarboxyphenyl) methane dianhydride, bis(3,4-dicarboxyphenyl) ethane dianhydride, oxydiphthalic anhydride, bis(3,4-dicarboxyphenyl) sulfone dianhydride, p-phenylenebis(trimellitic monoester acid anhydride), ethylenebis(trimellitic monoester acid anhydride), bisphenol-A bis(trimellitic monoester acid anhydride) and analogues thereof, which may be used alone or in mixtures thereof, mixed at predetermined ratios.

The diamine that may be used to prepare polyamic acid may include 4,4'-diaminodiphenylpropane, 4,4'-diaminodiphenylmethane, benzidine, 3,3'-dichlorobenzidine, 4,4'-diaminodiphenylsulfide, 3,3'-diaminodiphenylsulfone, 4,4'-diaminodiphenylsulfone, 4,4'-diaminodiphenylether (4,4'-oxydianiline), 3,3'-diaminodiphenylether (3,3'-oxydianiline), 3,4'-diaminodiphenylether (3,4'-oxydianiline), 1,5-diaminonaphthalene, 4,4'-diaminodiphenyl diethylsilane, 4,4'-diaminodiphenyl silane, 4,4'-diaminodiphenyl ethylphosphine oxide, 4,4'-diaminodiphenyl N-methylamine, 4,4'-diaminodiphenyl N-phenylamine, 1,4-diaminobenzene (p-phenylenediamine), 1,3-diaminobenzene, 1,2-diaminobenzene and analogues thereof, which may be used alone or in mixtures thereof, mixed at predetermined ratios.

The first organic solvent is not particularly limited, and any solvent may be used, so long as it dissolves polyamic acid, but it is preferably an amide-based solvent. Specifically, the solvent may be an organic polar solvent, particularly an aprotic polar solvent, and may include, without being limited to, at least one selected from the group consisting of N,N'-dimethylformamide (DMF), N,N'-dimethylacetamide, N-methyl-pyrrolidone (NMP), gamma-butyrolactone (GBL), and diglyme, which may be used alone or in combinations of two or more thereof, as necessary. In an exemplary embodiment, N,N-dimethylformamide and N,N-dimethylacetamide are particularly preferably used as the solvent.

In some cases, the precursor composition may further include a filler, such as calcium carbonate, dicalcium phosphate, and barium sulfate.

Examples of the method of polymerization of polyamic acid may include:

(1) a method of performing polymerization by placing the entire amount of the diamine monomer in a solvent and then adding a dianhydride monomer in a substantially equimolar amount to the diamine monomer;

(2) a method of performing polymerization by placing the entire amount of the dianhydride monomer in a solvent and then adding a diamine monomer in a substantially equimolar amount to the dianhydride monomer;

(3) a method of performing polymerization by placing some of the diamine monomer in a solvent, mixing some of the dianhydride monomer in an amount of about 95-105 mol % therewith, adding the remaining diamine monomer, and continuously adding the remaining dianhydride monomer such that the diamine monomer and the dianhydride monomer are substantially equimolar;

(4) a method of performing polymerization by placing a dianhydride monomer in a solvent, mixing some of the diamine compound in an amount of 95-105 mol % therewith, adding additional dianhydride monomer, and continuously adding the remaining diamine monomer such that the diamine monomer and the dianhydride monomer are substantially equimolar; and (5) a method of performing polymerization by reacting some of the diamine monomer and some of the dianhydride monomer in a solvent so that any one component thereof is added in excess to afford a first composition, reacting some of the diamine monomer and some of the dianhydride monomer in another solvent so that any one component thereof is added in excess to afford a second composition, mixing the first and second compositions, and completing polymerization, in which the first and second compositions are mixed under the condition that, when the diamine monomer is used in excess upon formation of the first composition, the dianhydride monomer is used in excess in the second composition, or that, when the dianhydride monomer is used in excess in the first composition, the diamine monomer is used in excess in the second composition, whereby the total amounts of the diamine monomer and the dianhydride monomer used in these reactions are substantially equimolar.

However, the method of polymerization of polyamic acid is not limited to the foregoing, and any known method may be used.

Meanwhile, in the polymerization, the viscosity of the polyamic acid may be 150,000 cP or more, particularly 230,000 cP or more, and more particularly 270,000 cP or more. The use of the polyimide film manufactured from the precursor composition is capable of manufacturing a graphite sheet having superior thermal conductivity compared to polyamic acid having a low viscosity of less than 150,000 cP.

In the step of preparing polyamic acid, 15 wt % to 25 wt % of polyamic acid and 75 wt % to 85 wt % of the first organic solvent may be added based on the total weight of polyamic acid, thus preparing a precursor composition. Given the above range, the appropriate weight average molecular weight of polyamic acid may be achieved through viscosity control.

Here, the amount of the polyamic acid corresponds to the total amount of the dianhydride monomer and the diamine monomer that are used in the reaction, and may be understood as "solid content of polyamic acid" present in the precursor composition.

The viscosity thereof preferably falls in the range from 90,000 cP to 400,000 cP, and particularly 250,000 cP to 350,000 cP.

The dianhydride monomer, the diamine monomer, and the organic solvent may be selectively used in the examples described above.

<Imidization Method>

In a specific embodiment, in the manufacturing method according to the present invention, the imidization may include first imidization through heat treatment at a relatively low temperature and second imidization through heat treatment at a relatively high temperature.

Here, the first imidization and the second imidization are sequentially performed to induce stepwise conversion from the first unit polymers into the second unit polymers.

Furthermore, the second unit polymers may be formed in an omnidirectionally distributed state in each of the first imidization and the second imidization.

The first imidization may include casting the precursor composition in a film form on a support such as a glass plate, an aluminum foil, an endless stainless steel belt, or a stainless steel drum. Thereafter, the precursor composition on the support is heated in the temperature range from 60° C. to less than 200° C., and preferably from 100° C. to less than 200° C. Thereby, the imidization accelerator and the dehydration agent are activated, and partial curing and/or drying occur, thereby forming a gel film, which is then peeled from the support, resulting in a gel film.

In the gel film, some of the first unit polymers are converted into the second unit polymers, and at least some of the converted second unit polymers may be distributed omnidirectionally.

The gel film thus obtained is fixed on a support such as a tenter, after which the temperature is variably adjusted in the range from 200° C. to 550° C., thereby obtaining a polyimide film in which substantially almost all amic acids are converted into imide groups, which is referred to as "second imidization".

The imidization accelerator and the dehydration agent may promote imidization in both the first imidization and the second imidization, and the imidization accelerator and the dehydration agent may mostly exist in the gel film until the second imidization is initiated.

The second imidization may include first heat treatment at a variable temperature in the range from 200° C. to 450° C. and second heat treatment at a variable temperature in the range from 470° C. to 550° C.

Second Aspect: Polyimide Film

The polyimide film according to the present invention includes:

second unit polymers in which the amic acid group of each of first unit polymers is converted into an imide group by catalyzing polyamic acid including the first unit polymers that are omnidirectionally distributed in the state of satisfying the following processing condition (a), in which at least some of the second unit polymers are omnidirectionally distributed.

$$540 \ \mu m < C^2 * T < 610 \ \mu m \qquad (a)$$

Here, C is the sum of the molar amount of the imidization accelerator that is added and the molar amount of the dehydration agent that is added relative to 1 mol of the amic acid group of polyamic acid, and T is the thickness of the polyimide film. Specifically, T may be 25 μm or more, which enables conversion into a graphite sheet, particularly 30 μm to 75 μm.

In the polyimide film of the present invention, since the second unit polymers thereof maintain the omnidirectionality of the first unit polymers, spaces having a variety of complex shapes may be formed between the second unit polymers.

The imidization reaction may be accelerated in the processing condition (a), so the omnidirectionality of the first unit polymers may be maintained in at least some of the second unit polymers.

As described above, the second unit polymers have omnidirectionality, and thus the polyimide film of the present invention may provide the following advantages.

Specifically, when manufacturing a graphite sheet using the polyimide film, gas flows efficiently from the inside of the film to the outside, making it possible to obtain a graphite sheet having good quality. This is deemed to be because relatively low thermal energy is required for carbon rearrangement, which is economical and is capable of exhibiting desired crystallinity.

Moreover, assuming that graphitization proceeds almost simultaneously on the surface layer of the polyimide film and inside, relatively low pressure is created in the gas generated from the inside, and thus, the gas exhausted through the surface layer does not destroy the carbonization structure that is forming or formed on the surface layer, or the extent of destruction thereof is low, whereby graphite in an intact surface state may be manufactured.

The extent to which the second unit polymers have omnidirectionality can be confirmed through, for example, an adhesion test for a corona-treated polyimide film.

As in the description of FIG. 1, the principle based on which the test is conducted relates to the fact that spaces are formed between the omnidirectional second unit polymers and thus the surface area becomes wider. Accordingly, the polyimide film of the present invention, in a corona-treated state, may have adhesion of 1400 gf/mm or more.

Meanwhile, the polyimide film of the present invention may be manufactured according to the "method of manufacturing polyimide film" described above.

Third Aspect: Graphite Sheet

The graphite sheet of the present invention may be manufactured using a polyimide film manufactured through the "method of manufacturing polyimide" as described above or the "polyimide film" as described above, and particularly may be manufactured by carbonizing and/or graphitizing the polyimide film.

The carbonization step may be performed using a hot press and/or an electric furnace under reduced pressure or in a nitrogen gas atmosphere. In the present invention, carbonization may be performed for about 1 hr to 5 hr at a temperature ranging from about 1,000° C. to 1,500° C.

In some cases, pressure may be applied in a vertical direction using a hot press in order to realize carbon orientation in a desired form. Here, a pressure of 5 kg/cm$^2$ or more, 15 kg/cm$^2$ or more, or 25 kg/cm$^2$ or more may be applied during the carbonization process, which is an exemplary embodiment to aid in implementation of the invention, and the scope of the present invention is not limited to the above pressure conditions.

Continuously therewith, the step of graphitization of the carbonized polyimide film may be performed.

The graphitization step may also be performed using a hot press and/or an electric furnace. The graphitization step may also be carried out using an inert gas, and a preferred example of the inert gas includes a mixed gas containing argon and a small amount of helium.

The heat-treatment temperature for the graphitization step is at least 2,500° C., and, in consideration of economy, 3,000° C. or less is preferable.

In some cases, a pressure of 100 kg/cm$^2$ or more, 200 kg/cm$^2$ or more, or 300 kg/cm$^2$ or more may be applied in the graphitization step, which is merely an exemplary embodiment to aid in implementation of the invention, and the scope of the present invention is not limited to the above pressure conditions.

DETAILED DESCRIPTION

A better understanding of the actions and effects of the present invention may be obtained through the following examples, which are set forth to illustrate and are not to be construed as limiting the scope of the present invention.

Example 1

Preparation of Precursor Composition 354.8 g of dimethylformamide was placed in a 0.7 L reactor, and the temperature was set to 30° C., after which 38.8 g of 4,4-diaminodiphenylether was added thereto and dissolved therein, after which 41.8 g of pyromellitic dianhydride was added thereto and dissolved therein. After completion of dissolution, the viscosity of the resulting solution was measured while pyromellitic dianhydride was added little by little thereto, thereby obtaining a varnish having a viscosity of about 250,000 cP to 300,000 cP.

Thereafter, 263.7 g of dimethylformamide, 54.3 g of β-picoline as an imidization accelerator, and 381.1 g of acetic anhydride as a dehydration agent were placed in the reactor, thus preparing a precursor composition.

Here, the molar amount of the imidization accelerator that was added relative to 1 mol of the amic acid group of polyamic acid was 0.46, and the molar amount of the dehydration agent that was added relative thereto was 3.00. These are summarized in Table 1 below for clear comparison between Examples and Comparative Examples.

Preparation of Gel Film

A gel film was manufactured in a manner in which the precursor composition prepared as described above was applied onto an endless stainless steel belt and the temperature was variably adjusted using hot air in the range from 60° C. to less than 200° C.

Preparation of Polyimide Film

The gel film prepared as described above was peeled from the endless belt and then fixed to a tenter. Thereafter, first heat treatment was performed by variably adjusting the temperature using hot air in the range from 200° C. to 400° C., and then second heat treatment was performed continuously by variably adjusting the temperature using an infrared-ray heater in the range of 550° C. or less but exceeding 450° C. Here, the average value of the highest temperature and the two temperatures closest thereto among the temperatures formed in the second heat treatment was 537° C. Thereafter, a polyimide film having a thickness of 50 μm was obtained.

Moreover, the values in the following processing conditions (a) and (b) were determined, and whether or not the processing conditions were satisfied was confirmed, and the results thereof are shown in Table 1 below.

$$540 \text{ μm} < C^2 * T < 610 \text{ μm} \tag{a}$$

$$1.0 \text{ μm/° C.} \leq (C^2 * T)/K \leq 1.25 \text{ μm/° C.} \tag{b}$$

Here, C is the sum of the molar amount of the imidization accelerator that is added and the molar amount of the dehydration agent that is added relative to 1 mol of the amic acid group of polyamic acid, T is the thickness of the polyimide film, and K is the average value of the highest temperature and the two temperatures closest thereto among the temperatures formed in the second heat treatment, and is 537° C.

Example 2

A polyimide film was manufactured in the same manner as in Example 1, with the exception that the molar amounts of the imidization accelerator and the dehydration agent that were added were changed as shown in Table 1 below, and the K value was adjusted to 529° C.

Moreover, the values determined in the processing conditions (a) and (b) are shown in Table 1 below, and whether these conditions were satisfied was confirmed.

Example 3

A polyimide film was manufactured in the same manner as in Example 1, with the exception that the molar amounts of the imidization accelerator and the dehydration agent that were added were changed as shown in Table 1 below, the K value was adjusted to 520° C., and the amount of the precursor composition that was applied was changed to form a polyimide film having a thickness of 62.5 μm.

Moreover, the values determined in the processing conditions (a) and (b) are shown in Table 1 below, and whether these conditions were satisfied was confirmed.

Comparative Example 1

A polyimide film was manufactured in the same manner as in Example 1, with the exception that the molar amounts of the imidization accelerator and the dehydration agent that were added were changed as shown in Table 1 below, and the K value was adjusted to 547° C.

Moreover, the values determined in the processing conditions (a) and (b) are shown in Table 1 below, and whether these conditions were satisfied was confirmed.

Comparative Example 2

A polyimide film was manufactured in the same manner as in Example 1, with the exception that the molar amounts of the imidization accelerator and the dehydration agent that were added were changed as shown in Table 1 below, and the K value was adjusted to 564° C.

Moreover, the values determined in the processing conditions (a) and (b) are shown in Table 1 below, and whether these conditions were satisfied was confirmed.

Comparative Example 3

A polyimide film was manufactured in the same manner as in Example 1, with the exception that the molar amounts of the imidization accelerator and the dehydration agent that were added were changed as shown in Table 1 below, the K value was adjusted to 534° C., and the amount of the precursor composition that was applied was changed to form a polyimide film having a thickness of 62.5 μm.

Moreover, the values determined in the processing conditions (a) and (b) are shown in Table 1 below, and whether these conditions were satisfied was confirmed.

TABLE 1

| | Film thick. (μm) | Molar amount of imidization accelerator | Molar amount of dehydration agent | Processing condition (a) (μm) | Whether processing condition (a) is satisfied | K value (° C.) | Processing condition (b) (μm/° C.) | Whether processing condition (b) is satisfied |
|---|---|---|---|---|---|---|---|---|
| Example 1 | 50 | 0.46 | 3.00 | 598 | ○ | 537 | 1.11 | ○ |
| Example 2 | 50 | 0.47 | 3.00 | 602 | ○ | 529 | 1.14 | ○ |
| Example 3 | 62.5 | 0.43 | 2.51 | 540 | ○ | 520 | 1.04 | ○ |
| Comparative Example 1 | 50 | 0.43 | 2.75 | 505 | X | 547 | 0.92 | X |
| Comparative Example 2 | 50 | 0.51 | 3.30 | 726 | X | 564 | 1.29 | X |
| Comparative Example 3 | 62.5 | 0.4 | 2.5 | 525 | X | 534 | 0.98 | X |

As is apparent from Table 1, the polyimide films manufactured in Example 1 to Example 3 satisfied not only processing condition (a) but also processing condition (b), but the polyimide films manufactured in Comparative Example 1 to Comparative Example 3 did not satisfy processing condition (a), which is the highest priority, and also did not satisfy processing condition (b).

The importance of satisfying the processing condition (a) and the processing condition (b) will be clearly stated later, but these conditions can act decisively on the formation of the omnidirectional second unit polymers, and in connection therewith, it is possible to realize a graphite sheet having a good appearance and superior thermal properties.

Test Example 1: Test of Adhesion of Polyimide Film

The polyimide film manufactured in each of Example 1 to Example 3 and Comparative Example 1 and Comparative Example 3 was subjected to corona treatment.

Thereafter, an adhesive was applied onto one surface of the polyimide film, and a copper foil, an interlayer paper and a hot plate were sequentially laminated on the adhesive and then compressed and bonded at a temperature of 180° C. under a pressure of 0.3 Kpa, thereby completing a layup structure.

The finished layup structure was cut to a width of 10 mm*a length 150 mm, and while the copper foil directly adhered to the polyimide film was peeled off, the adhesion "z" of the polyimide film was measured. The results thereof are shown in Table 2 below.

TABLE 2

| | Adhesion (gf/mm) |
|---|---|
| Example 1 | 1400 or more |
| Example 2 | 1400 or more |
| Example 3 | 1400 or more |
| Comparative Example 1 | 880 |
| Comparative Example 2 | 1400 or more |
| Comparative Example 3 | 820 |

In general, the higher the proportion of the omnidirectional polymer chain, the higher the adhesion after corona treatment.

As shown in Table 2, the polyimide films of Example 1 to Example 3 and Comparative Example 2 exhibited a remarkable difference in adhesion compared to Comparative Example 1 and Comparative Example 3.

As discussed above, adhesion may be regarded as an indicator of the proportion of polymers in an omnidirectional state, which suggests that the proportion of the omnidirectional second unit polymers in the polyimide films of Example 1 to Example 3 and Comparative Example 2 showing high adhesion was high.

On the other hand, the polyimide films of Comparative Example 1 and Comparative Example 3 were measured to have relatively low adhesion, indicating that the proportion of the second unit polymers that were omnidirectionally distributed was relatively small.

Also, in Comparative Example 2, in which the imidization accelerator and the dehydration agent were added in excess in order to increase the proportion of the omnidirectional second unit polymers, the proportion of the omnidirectional second unit polymers was also regarded as high based on the observed high adhesion. However, Comparative Example 2 did not satisfy the processing conditions (a) and (b), and, as is apparent from the following test results, not only did appearance defects occur on the surface, but the thermal conductivity of the graphite sheet obtained therefrom was also reduced, which is undesirable.

This suggests that the second unit polymers in an omnidirectional state are formed and distributed in the polyimide film that satisfies the processing conditions (a) and (b) without causing surface appearance defects.

Test Example 2: Test of Color L of Polyimide Film

The color L of the polyimide films manufactured in Example 1 to Example 3 and Comparative Example 1 to Comparative Example 3 was tested. The results thereof are shown in Table 3 below.

TABLE 3

| | Color L |
|---|---|
| Example 1 | 73 |
| Example 2 | 73.5 |
| Example 3 | 65.5 |
| Comparative Example 1 | 71 |
| Comparative Example 2 | 70.5 |
| Comparative Example 3 | 65 |

In general, when comparing films having the same thickness, the higher the proportion of the omnidirectional polymer chain, the higher the color L of the film. As is apparent from Table 3, there was a slight difference in color L between Examples 1 and 2 and Comparative Examples 1 and 2, having the same thickness.

This can be understood to be the main evidence suggesting that the second unit polymers are mainly omnidirectionally distributed in the polyimide films of Examples 1 and 2, along with the results of Table 2.

In contrast, the polyimide films of Comparative Examples 1 and 2 have relatively low color L, and unlike the results of Examples, it can be determined that there are relatively few second unit polymers that are omnidirectionally distributed in the polyimide film.

Likewise, in Example 3 and Comparative Example 3, having the same thickness, the same results as the above results were obtained, and the significance thereof will be considered the same.

Example 4 to Example 6

The polyimide film obtained in each of Example 1 to Example 3 was subjected to a carbonization process by raising the temperature to 1200° C. at a rate of 1.5° C./min under nitrogen gas using an electric furnace capable of carbonization, after which formation of graphite was completed by raising the temperature to 2800° C. using an electric furnace at a heating rate of 5° C./min under argon gas, followed by cooling to afford the graphite sheet of each of Example 4 to Example 6. The thicknesses of the graphite sheets thus obtained are summarized in Table 4 below.

Comparative Example 4 to Comparative Example 6

The polyimide film obtained in each of Comparative Example 1 to Comparative Example 3 was subjected to a carbonization process by raising the temperature thereof to 1200° C. at a rate of 1.5° C./min under nitrogen gas using an electric furnace capable of carbonization, after which the formation of graphite was completed by raising the temperature to 2800° C. using an electric furnace at a heating rate of 5° C./min under argon gas, followed by cooling to afford the graphite sheet of each of Comparative Example 4 to Comparative Example 6. The thicknesses of the graphite sheets thus obtained are summarized in Table 4 below.

Test Example 3: Evaluation of Properties of Graphite Sheet

The thermal diffusivity of the graphite sheets obtained in Example 4 to Example 6 and Comparative Example 4 to Comparative Example 6 was measured through a laser flash method using a thermal diffusivity meter (model name LFA 467, Netsch), and the thermal conductivity was calculated by multiplying the measured thermal diffusivity value by density (weight/volume) and specific heat (theoretical value: 0.85 kJ/(kg·K)).

TABLE 4

| | PI film thickness (μm) | Graphite sheet thickness (μm) | Thermal diffusivity (mm²/s) | Thermal conductivity (W/m · K) |
|---|---|---|---|---|
| Example 4 | 50 | 25 | 945 | 1681 |
| Example 5 | 50 | 25 | 960 | 1673 |
| Example 6 | 62.5 | 35 | 867 | 1254 |

TABLE 4-continued

| | PI film thickness (μm) | Graphite sheet thickness (μm) | Thermal diffusivity (mm²/s) | Thermal conductivity (W/m · K) |
|---|---|---|---|---|
| Comparative Example 4 | 50 | 25 | 848 | 1574 |
| Comparative Example 5 | 50 | 25 | 792 | 1456 |
| Comparative Example 6 | 62.5 | 35 | 818 | 1147 |

Table 4 shows that, when comparing graphite sheets having the same thickness, Examples exhibited significantly better thermal conductivity and thermal diffusivity than Comparative Examples.

When specifically analyzing Table 4, the following results are evident.

Example 4 exhibited thermal conductivity that was improved by about 7% and 15% compared to Comparative Example 4 and Comparative Example 5, respectively, and similar results were obtained for thermal diffusivity.

Example 5 exhibited thermal conductivity that was improved by about 6% and 15% compared to Comparative Example 4 and Comparative Example 5, respectively, and similar results were obtained for thermal diffusivity.

Example 6 exhibited thermal conductivity that was improved by 9% compared to Comparative Example 6, and similar results were obtained for thermal diffusivity.

Specifically, when the graphite sheet is manufactured from the polyimide film satisfying both processing conditions (a) and (b), it has properties superior to a graphite sheet manufactured from a polyimide film not satisfying the same. Briefly, the processing condition (a) and the processing condition (b) can be regarded as essential factors in achieving the above results.

Test Example 4: Evaluation of Appearance of Graphite Sheet

Figure 2:
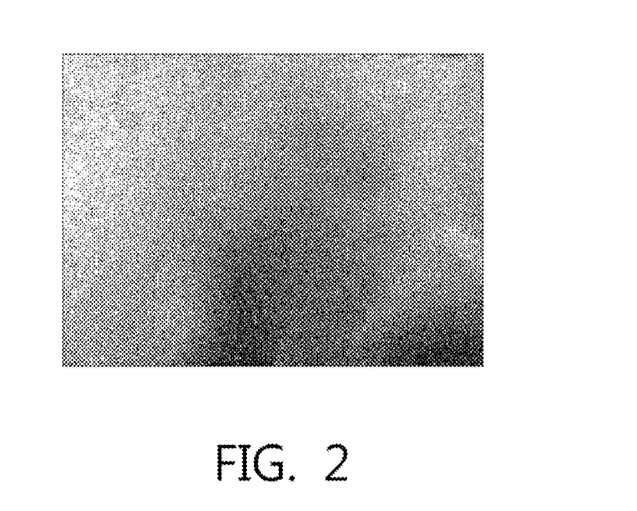
FIG. 2 shows an image of the surface of the graphite sheet of Example 4.
Figure 3:
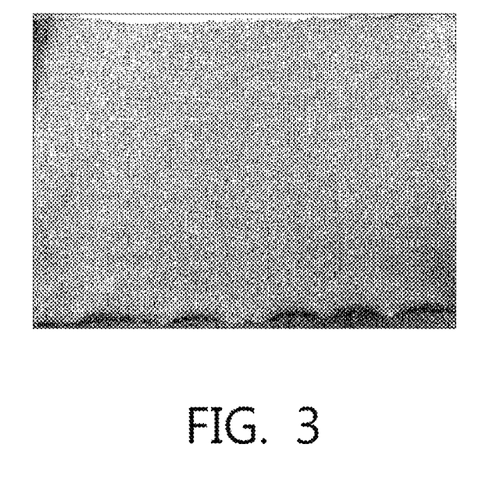
FIG. 3 shows an image of the surface of the graphite sheet of Example 5.
Figure 4:
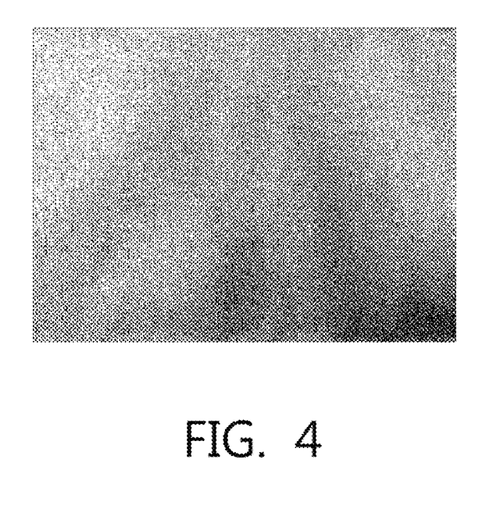
FIG. 4 shows an image of the surface of the graphite sheet of Example 6.
Figure 5:
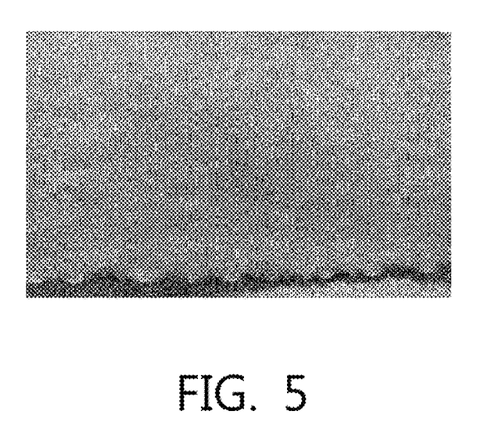
FIG. 5 shows an image of the surface of the graphite sheet of Comparative Example 4.
Figure 6:
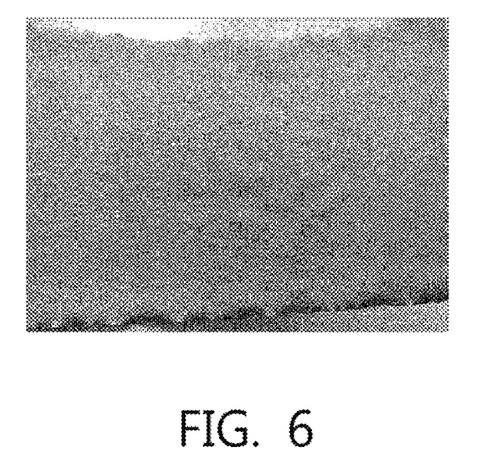
FIG. 6 shows an image of the surface of the graphite sheet of Comparative Example 5.
Figure 7:
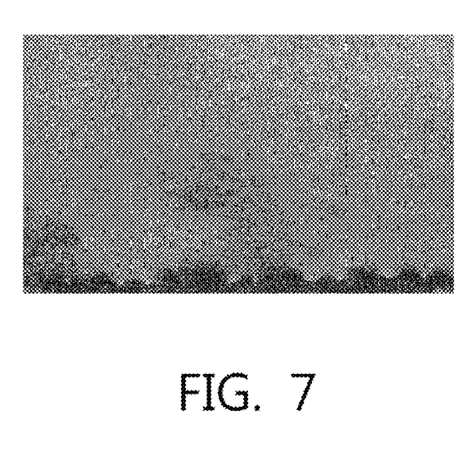
FIG. 7 shows an image of the surface of the graphite sheet of Comparative Example 6.

The number of defects per unit area (220 mm*254 mm) and the size of defects were observed for surface defects such as protrusions and the like in the graphite sheets manufactured in Examples and Comparative Examples, and the results of appearance evaluation grading according to the following criteria are shown in Table 5 below. For reference, a grade of B or higher is considered good, and a grade of C or lower can be judged to be defective.

grade A: average protrusion size less than 0.3 mm; fewer than 10 protrusions grade B: average protrusion size of 0.3 mm to 0.5 mm; fewer than 10 protrusions grade C: average protrusion size of 0.3 mm to 0.5 mm; 10 protrusions or more grade D: average protrusion size greater than 0.5 mm or generation over the entire area Respective surface images of the graphite sheets of Example 4 to Example 6 are shown in FIG. 2 to FIG. 4, and respective surface images of the graphite sheets of Comparative Example 4 to Comparative Example 6 are shown in FIG. 5 to FIG. 7.

TABLE 5

| | Appearance evaluation (grade) |
|---|---|
| Example 4 | A |
| Example 5 | A |
| Example 6 | A |
| Comparative Example 4 | C |
| Comparative Example 5 | D |
| Comparative Example 6 | C |

In the graphite sheets of Examples, protrusions were fine enough to make it difficult to check the size thereof, or defects such as protrusions were not observed, and thus the appearance evaluation grade thereof was excellent, as shown in Table 5.

With reference to the images of FIG. 2 to FIG. 4, in the graphite sheets of Examples, defects such as protrusions and the like were not observed on the surface, and the surface was smooth. This is deemed to be because the processing conditions (a) and (b) were satisfied, whereby the polyimide film including omnidirectional unit polymers could be manufactured without surface defects, and also because, in the graphite sheets of Examples 4 to 6 manufactured using the same, damage to the graphite structure on the surface was suppressed while the sublimation gas was efficiently exhausted during the carbonization and graphitization processes.

In Comparative Examples 4 to 6, the graphite sheet was manufactured using the polyimide film obtained through a method not satisfying the processing conditions (a) and (b). As shown in Table 5 and in FIGS. 4 to 7, results that contrasted strongly with the Examples were obtained.

In particular, in the graphite sheet of Comparative Example 5, manufactured using Comparative Example 2, in which the imidization accelerator and the dehydration agent were added in excess in order to increase the proportion of omnidirectional second unit polymers, even when the polyimide film included the omnidirectional second unit polymers, severe appearance defects were generated on the surface, so the thermal conductivity of the graphite sheet was reduced. This is deemed to be because imidization was partially promoted in excess in the casting step during the process of manufacturing the polyimide film of Comparative Example 2, resulting in appearance defects such as pinholes and the like. It is expected that the appearance defects generated in the polyimide film step suppress the formation of the graphite structure even in the step of manufacturing the graphite sheet, leading to a decrease in overall thermal conductivity.

In Comparative Examples 4 and 6, the omnidirectional polymer was present in excess, or the advantage of the omnidirectional state was not exhibited in Comparative Examples, which is presumed to be caused by the destruction of the graphite structure due to the sublimation gas.

Although the present invention has been described above with reference to embodiments thereof, those skilled in the art to which the present invention belongs will understand that it is possible to implement various applications and modifications without exceeding the scope of the present invention based on the above description.

INDUSTRIAL APPLICABILITY

The present invention discloses specific processing conditions related to the imidization accelerator, the dehydration agent and the heat-treatment temperature, and provides a method of manufacturing a polyimide film that satisfies the specific processing conditions.

The manufacturing method according to the present invention is advantageously capable of manufacturing a polyimide film including second unit polymers that are omnidirectionally distributed. This polyimide film is suitable for realizing a graphite sheet having good quality because multiple and complex gas exhaust pathways can be set between the omnidirectionally distributed second unit polymers, so even when the polyimide film is processed through carbonization and graphitization, gas is efficiently exhausted.

The present invention also provides a polyimide film in which the second unit polymers maintain the omnidirectionality of the first unit polymers, so spaces having a variety of complex shapes are formed between the second unit polymers.

When manufacturing the graphite sheet using such a polyimide film, gas flows efficiently from the inside of the film to the outside, resulting in a graphite sheet having good quality. This can be due to the fact that relatively low thermal energy is required for carbon rearrangement, which is economical and enables realization of desired crystallinity. In addition, assuming that graphitization proceeds almost simultaneously on the surface layer of the polyimide film and inside, relatively low pressure is created in the gas generated from the inside, and the gas exhausted through the surface layer does not destroy the carbonization structure that is forming or formed on the surface layer, or the extent of destruction thereof is low, whereby graphite in an intact surface state can be manufactured. Therefore, the polyimide film according to the present invention is suitable for formation of a graphite sheet having good quality.

The present invention can also provide a graphite sheet having a good appearance by being manufactured using the polyimide film as described above.

What is claimed is:

1. A method of manufacturing a polyimide film, comprising:
    preparing a polyamic acid solution comprising first unit polymers by mixing a first organic solvent, a diamine monomer and a dianhydride monomer;
    preparing a precursor composition by mixing the polyamic acid solution, at least one imidization accelerator, and at least one dehydration agent; and
    forming a polyimide film comprising second unit polymers into which the first unit polymers are converted by imidizing the precursor composition at a variable temperature,
    wherein the molar amount of said at least one imidization accelerator that is added is 0.43 to 0.6 relative to 1 mol of the amic acid group of the polyamic acid, and the molar amount of said at least one dehydration agent that is added is 2.50 to 3 relative to 1 mol of the amic acid group of the polyamic acid
    wherein when a processing condition (a) below is satisfied, at least a portion of the first unit polymers is imidized to the first state, thus forming the second unit polymers, which are omnidirectionally distributed:

$$540 \ \mu m < C^2 * T < 610 \ \mu m \quad (a)$$

wherein C is a sum of a molar amount of said at least one imidization accelerator that is added and a molar amount of said at least one dehydration agent that is added relative to 1 mol of an amic acid group of the polyamic acid, T is a thickness of the polyimide film, and is 30 µm or more to 75 µm or less.

2. The method of claim 1, wherein said at least one imidization accelerator is a component having an effect of promoting a ring-closing dehydration reaction of the amic acid group of each of the first unit polymers.

3. The method of claim 1, wherein said at least one imidization accelerator is at least one selected from the group consisting of quinoline, isoquinoline, β-picoline, and pyridine.

4. The method of claim 1, wherein said at least one dehydration agent is a component that enables dehydration and ring closure of the amic acid group of each of the first unit polymers.

5. The method of claim 1, wherein said at least one dehydration agent is at least one selected from the group consisting of acetic anhydride, propionic anhydride, and lactic anhydride.

6. The method of claim 1, wherein, in the preparing the precursor composition, a second organic solvent is added along with said at least one imidization accelerator and the dehydration agent.

7. The method of claim 1, wherein adhesion of the polyimide film measured by a measurement method is 1400 gf/mm or more,
    wherein the measurement method comprises the steps of:
    a) corona treating the polyimide film;
    b) applying adhesive to one side of the polyimide film;
    c) forming a layup structure by sequentially stacking and pressing copper foil, interleaf paper, and a hot plate on the adhesive; and
    d) peeling off the copper foil adhered to the polyimide film.

8. The method of claim 1, wherein the imidizing comprises first imidization and second imidization,
    wherein the first imidization is performed at a variable temperature in a range from 60° C. or less to 200° C. and
    the second imidization comprises first heat treatment at a variable temperature in a range from 200° C. to 450° C. and second heat treatment at a variable temperature in a range of 550° C. or less but exceeding 450° C., and
    a processing condition (b) below is further satisfied in addition to the processing condition (a):

$$1.0 \ \mu m/^\circ C. \leq (C^2 * T)/1.25 \ \mu m/^\circ C. \quad (b)$$

wherein C is a sum of a molar amount of the imidization accelerator that is added and a molar amount of the dehydration agent that is added relative to 1 mol of an amic acid group of the polyamic acid, T is a thickness of the polyimide film and is 30 µm or more to 75 µm or less, and K is an average value of a highest temperature and two temperatures closest thereto among temperatures formed in the second heat treatment.

9. The method of claim 8, wherein the first imidization and the second imidization are sequentially performed, whereby conversion from the first unit polymers into the second unit polymers is induced stepwise, and the second unit polymers are formed in an omnidirectionally distributed state in each of the first imidization and the second imidization.

10. The method of claim 8, wherein at least one of the first heat treatment and the second heat treatment is performed using an infrared-ray heater.

11. A polyimide film comprising second unit polymers in which an amic acid group of each of first unit polymers is converted into an imide group by catalyzing polyamic acid comprising the first unit polymers that are omnidirectionally distributed in a state of satisfying a processing condition (a) below, at least a portion of the second unit polymers being omnidirectionally distributed:

$$540 \text{ μm} < C^2 * T < 610 \text{ μm} \qquad (a)$$

wherein C is a sum of a molar amount of the imidization accelerator that is added and a molar amount of the dehydration agent that is added relative to 1 mol of an amic acid group of the polyamic acid, and T is a thickness of the polyimide film and is 30 μm or more to 75 μm or less, wherein the molar amount of the imidization accelerator that is added is 0.43 to 0.6 relative to 1 mol of the amic acid group of the polyamic acid, and the molar amount of the dehydration agent that is added is 2.50 to 3 relative to 1 mol of the amic acid group of the polyamic acid.

12. The polyimide film of claim 11, wherein imidization is accelerated in the processing condition (a), and thus omnidirectionality of the first unit polymers is maintained in at least a portion of the second unit polymers.

13. The polyimide film of claim 11, wherein adhesion of the polyimide film measured by a measurement method is 1400 gf/mm or more, wherein the measurement comprises the steps of:
  a) corona treating the polyimide film;
  b) applying adhesive to one side of the polyimide film;
  c) forming a layup structure by sequentially stacking and pressing copper foil, interleaf paper, and a hot plate on the adhesive; and
  d) peeling off the copper foil adhered to the polyimide film.

* * * * *